United States Patent [19]

Swartz

[11] Patent Number: 4,659,194
[45] Date of Patent: Apr. 21, 1987

[54] BINOCULAR FOCUSING MECHANISM

[75] Inventor: James R. Swartz, Glen Ellyn, Ill.

[73] Assignee: Sears, Roebuck and Co., Chicago, Ill.

[21] Appl. No.: 661,060

[22] Filed: Oct. 15, 1984

[51] Int. Cl.$^4$ .............................................. G02B 23/00
[52] U.S. Cl. ................................................... 350/552
[58] Field of Search ................ 350/552, 554, 555, 556

[56] References Cited

U.S. PATENT DOCUMENTS

| | | |
|---|---|---|
| D. 14,423 | 11/1883 | Bradley . |
| D. 65,567 | 9/1924 | Hahn . |
| D. 83,585 | 3/1931 | Trautmann . |
| D. 98,185 | 1/1936 | Reynolds . |
| D. 98,790 | 3/1936 | Wollensak et al. . |
| D. 116,921 | 10/1939 | Sierad . |
| D. 117,169 | 10/1939 | Dobrusin . |
| D. 123,679 | 11/1940 | Mowrey . |
| D. 126,480 | 4/1941 | MacCowan . |
| D. 140,437 | 2/1945 | Bugel ............................ D57/1 |
| D. 146,487 | 3/1947 | Shields .......................... D57/1 |
| D. 156,733 | 1/1950 | Hofer et al. ................... D57/1 |
| D. 170,981 | 12/1953 | Kane ............................. D57/1 |
| D. 179,084 | 10/1956 | Jensen ........................... D57/1 |
| D. 182,304 | 3/1958 | Rosiello et al. ............... D57/1 |
| D. 184,881 | 4/1959 | Maguire ........................ D57/1 |
| D. 195,146 | 4/1963 | Jensen ........................... D57/1 |
| 198,195 | 12/1877 | Finch . |
| D. 208,587 | 9/1967 | Herold .......................... D57/1 |
| D. 222,563 | 11/1971 | Maguire ........................ D57/1 |
| D. 224,568 | 8/1972 | Baughman .................... D57/1 |
| D. 235,684 | 7/1975 | Michel ......................... D57/1 E |
| D. 240,268 | 6/1976 | Huckenbeck .................. D16/59 |
| D. 240,458 | 7/1976 | Takahashi et al. ............ D16/63 |
| D. 240,860 | 8/1976 | Huckenbeck .................. D16/59 |
| D. 241,165 | 8/1976 | Huckenbeck .................. D16/59 |
| D. 241,166 | 8/1976 | Huckenbeck .................. D16/59 |
| D. 241,271 | 8/1976 | Huckenbeck .................. D57/1 E |
| D. 241,371 | 9/1976 | Huckenbeck .................. D16/83 |
| D. 241,680 | 9/1976 | Huckenbeck .................. D16/59 |
| D. 241,978 | 10/1976 | Huckenbeck .................. D16/59 |
| D. 243,761 | 3/1977 | Huckenbeck .................. D16/59 |
| D. 245,081 | 7/1977 | Gerdom ........................ D16/59 |
| D. 251,197 | 2/1979 | Kobayashi .................... D16/59 |
| D. 255,691 | 7/1980 | Huckenbeck .................. D16/59 |
| 264,130 | 9/1882 | Blank . |
| D. 265,207 | 6/1982 | Rosenfield et al. ............ D16/133 |
| 351,317 | 10/1886 | Fradley . |
| 398,277 | 2/1889 | Plessy . |
| 399,542 | 3/1889 | Mack . |
| 409,927 | 8/1889 | Clements . |
| 411,527 | 9/1889 | Meyrowitz . |
| 424,399 | 3/1890 | Tanneguy De Wogan . |
| 468,337 | 2/1892 | Glocker . |
| 491,711 | 2/1893 | Levy . |
| 498,019 | 5/1893 | Murray . |
| 535,862 | 3/1895 | Sawyer . |
| 567,215 | 9/1896 | Blank . |
| 615,229 | 11/1898 | Barton . |
| 647,136 | 4/1900 | Glocker . |

(List continued on next page.)

Primary Examiner—John K. Corbin
Assistant Examiner—Vincent J. Lemmo
Attorney, Agent, or Firm—Wood, Dalton, Phillips, Mason & Rowe

[57] ABSTRACT

A binocular focusing mechanism for a binocular having a pair of telescopes disposed in parallel relation. The binocular has optical elements in each of the telescopes for magnifying an object image. The optical elements are focused by movement generated by the focusing mechanism which includes a pivotable knob operatively joined ot the optical elements. The knob is a generally elongated member normally extending generally parallel to the telescopes and is mounted between the telescopes in a plane extending generally parallel to the plane defined by the telescopes for pivotable movement about a pivot point located generally at one end thereof. The pivot point of the elongated member is defined by a fastener disposed generally perpendicular to the plane defined by the telescopes. The binocular also includes a finger contacting portion on the elongated member generally at the end opposite the pivot point of the knob. With this construction, pivotable movement of the elongated member about the pivot point causes movement of the optical elements to effect focus of the binocular.

21 Claims, 6 Drawing Figures

U.S. PATENT DOCUMENTS

| | | | |
|---|---|---|---|
| 666,611 | 1/1901 | Aitchison . | |
| 674,465 | 5/1901 | Hensoldt . | |
| 687,373 | 11/1901 | Goerz . | |
| 782,553 | 2/1905 | Glocker . | |
| 838,651 | 12/1906 | Saegmuller . | |
| 841,262 | 1/1907 | Martin . | |
| 849,237 | 4/1907 | Heath . | |
| 898,653 | 9/1908 | Jacob . | |
| 937,834 | 10/1909 | Martin et al. . | |
| 947,971 | 2/1910 | Konig . | |
| 1,016,315 | 2/1912 | Barton . | |
| 1,063,310 | 10/1937 | Ludovici . | |
| 1,092,224 | 4/1914 | Nesdall . | |
| 1,127,720 | 2/1915 | Baille-Lemaire . | |
| 1,167,164 | 1/1916 | Grebe . | |
| 1,233,350 | 7/1917 | Hart . | |
| 1,339,386 | 5/1920 | Ham . | |
| 1,358,721 | 11/1920 | Fujii . | |
| 1,412,442 | 4/1922 | Ahmels . | |
| 1,479,409 | 1/1924 | Estrom . | |
| 1,497,294 | 6/1924 | Erfle . | |
| 1,512,705 | 10/1924 | Margaretten et al. . | |
| 1,554,939 | 9/1925 | Wollensak . | |
| 1,920,345 | 8/1933 | Biernat . | |
| 1,952,224 | 3/1934 | Trautmann et al. | 88/34 |
| 1,967,738 | 7/1934 | Boydston | 88/34 |
| 2,024,322 | 12/1935 | Wittig | 88/41 |
| 2,079,890 | 5/1937 | Wollensak et al. | 88/33 |
| 2,105,348 | 1/1938 | Chestnut, Jr. | 88/34 |
| 2,131,163 | 9/1938 | Casey | 88/34 |
| 2,285,388 | 6/1942 | Benard | 88/34 |
| 2,342,843 | 2/1944 | Corte et al. | 88/34 |
| 2,428,719 | 10/1947 | Nemeth | 88/57 |
| 2,534,776 | 12/1950 | Kershaw et al. | 88/34 |
| 2,602,371 | 7/1952 | Harford | 88/34 |
| 2,625,854 | 1/1953 | Hayward | 88/32 |
| 2,709,942 | 6/1955 | Blum et al. | 88/1 |
| 2,811,895 | 11/1957 | Jensen | 88/34 |
| 2,882,791 | 4/1959 | Moller et al. | 88/34 |
| 2,988,955 | 6/1961 | Sampei Goto et al. | 88/34 |
| 2,988,974 | 6/1961 | Clifford et al. | 95/44 |
| 3,029,696 | 4/1962 | Schmidt | 88/41 |
| 3,051,046 | 8/1962 | Thompson | 88/33 |
| 3,062,098 | 11/1962 | Dowling et al. | 88/34 |
| 3,076,381 | 2/1963 | Dowling et al. | 88/34 |
| 3,170,024 | 2/1965 | Dowling et al. | 88/34 |
| 3,244,072 | 4/1966 | Dowling et al. | 88/35 |
| 3,454,773 | 7/1969 | Bulthuis et al. | 250/213 |
| 3,484,149 | 12/1969 | Becker et al. | 350/76 |
| 3,508,805 | 4/1970 | Bray | 350/46 |
| 3,528,724 | 9/1970 | Bertin | 350/159 |
| 3,540,792 | 11/1970 | Akin, Jr. | 350/77 |
| 3,712,704 | 1/1973 | Sato | 350/76 |
| 3,744,872 | 7/1973 | Akin, Jr. et al. | 350/36 |
| 3,814,496 | 6/1974 | Mukai | 350/75 |
| 3,829,194 | 8/1974 | Van Exel et al. | 350/76 |
| 4,030,808 | 6/1977 | Hornschu et al. | 350/36 |
| 4,066,329 | 1/1978 | Van Exel | 350/77 |
| 4,080,042 | 3/1978 | Hornschu et al. | 350/36 |
| 4,080,043 | 3/1978 | Altenheiner et al. | 350/76 |
| 4,087,153 | 5/1978 | Hengst | 350/76 |
| 4,162,820 | 7/1979 | Schwab et al. | 350/36 |
| 4,171,865 | 10/1979 | Kamakura | 350/41 |
| 4,186,992 | 2/1980 | Kamakura | 350/36 |
| 4,202,598 | 5/1980 | Jenkins | 350/36 |
| 4,205,894 | 6/1980 | Filipovich et al. | 350/35 |
| 4,240,690 | 12/1980 | Kimura | 350/36 |
| 4,262,990 | 4/1981 | Kamakura | 350/44 |
| 4,280,750 | 7/1981 | Uchiyama | 350/76 |
| 4,281,890 | 8/1981 | Van Exel | 350/77 |
| 4,306,764 | 12/1981 | Kikuchi | 350/76 |
| 4,316,649 | 2/1982 | Alvarez et al. | 350/16 |

FOREIGN PATENT DOCUMENTS

| | | | |
|---|---|---|---|
| 143866 | 6/1902 | Austria . | |
| 338207 | 6/1921 | Fed. Rep. of Germany . | |
| 1203976 | 10/1965 | Fed. Rep. of Germany . | |
| 6745 | 1/1921 | Netherlands . | |
| 5287 | of 1890 | United Kingdom . | |
| 9204 | of 1897 | United Kingdom . | |
| 6656 | of 1903 | United Kingdom | 350/556 |
| 504032 | 4/1939 | United Kingdom . | |

BINOCULAR FOCUSING MECHANISM

BACKGROUND OF THE INVENTION

The present invention generally relates to binoculars and, more particularly, to a binocular focusing mechanism for a binocular having generally parallel telescopes with movable optical elements.

Conventional binoculars have utilized various different types of focusing mechanisms including individually rotatable ocular lenses or eye pieces. Since this type of focusing mechanism is slow and difficult to use, many manufacturers have adopted the more efficient center-focusing binoculars having a wheel centrally mounted between two spaced apart telescopes each holding optical elements where the wheel is coupled by a bridge member to housings slidably mounted in the telescope bodies. With this arrangement, the wheel can be rotated to cause the housings to move relative to the bodies to bring about relative movement of the optical elements to achieve simultaneous focusing.

While center-focusing binoculars are common, they have several inherent problems making them less than fully satisfactory for effecting focus. For instance, the wheel is oftentimes out of reach unless one hand is shifted from a normal and naturally assumed gripping position to place a finger against the wheel, and this problem is even more pronounced for persons having small hands. As a result of this problem, users have experienced considerable difficulty in holding binoculars steady during focusing.

Moreover, with center-focusing binoculars of the wheel type, the wheel must usually be rotated to a significant degree. This requires further shifting of the hands as the fingers are required to either ride up and over the center of the binocular as the wheel is rotated or, alternatively, the finger must frequently be removed from the wheel and then again engage the wheel at a lower point on the circumference after the wheel has been rotated only by a very slight amount. While attempts have been made to provide a wheel that focuses in a rapid manner, the fact remains that the use of a wheel does not adequately take into account the physiological effects on the user.

In view of these and other problems, it has remained to provide a binocular focusing mechanism that is fully satisfactory.

SUMMARY OF THE INVENTION

Accordingly, the present invention is directed to a binocular focusing mechanism for a binocular having telescopes disposed in generally parallel relation. The binocular has optical elements in each of the telescopes for magnifying an object image. The optical elements are focused by movement generated by the focusing mechanism which includes a pivotable knob operatively joined to the optical elements. The knob is a generally elongated member normally extending generally parallel to the telescopes and is mounted between the telescopes in a plane extending generally parallel to the plane defined by the telescopes for pivotable movement about a pivot point located generally at one end thereof. The pivot point of the elongated member is defined by a fastener disposed generally perpendicular to the plane defined by the telescopes. The binocular also includes a finger contacting portion on the elongated member generally at the end opposite the pivot point of the knob. With this construction, pivotable movement of the elongated member about the pivot point causes movement of the optical elements to effect focus of the binocular.

In a preferred embodiment, the finger contacting portion includes a first finger engaging surface facing one of the telescopes and a second finger engaging surface facing the other of the telescopes. Preferably, the finger engaging surfaces are disposed generally perpendicular to the plane defined by the telescopes for engagement by at least one finger of each hand of a user. Still more particularly, the finger engaging surfaces are spaced apart to lie in generally parallel planes.

In addition, the finger engaging surfaces are preferably located to accommodate back and forth movement of the knob. The movement of the knob is advantageously effected by pressing on one finger engaging surface with at least one finger of one hand and pressing on the other finger engaging surface with at least one finger of the other hand to apply generally colinear and oppositely directed forces. With this arrangement, the force applied by pressing on one finger engaging surface may be countered with force applied by pressing on the other finger engaging surface to quickly effect focus.

Moreover, the pivotable knob is operatively joined to the optical elements by coupling means responsive to pivotable movement of the elongated member to move the optical elements. The coupling means includes a connecting member joining the optical elements in the telescopes where the connecting member includes a pin extending therefrom and cam means operatively joining the pin and knob. With this arrangement, the cam means preferably includes a cam pin supported on one of the connecting member pin or knob and a cam slot provided on the other of the connecting member pin or knob.

Still more particularly, the cam pin is advantageously secured to and extends radially from the connecting member pin in engagement with the cam slot. It will be appreciated that the cam slot is preferably disposed intermediate the ends of the knob between the finger contacting portion and the pivot point thereof. As a result, the knob is adapted to drive the connecting pin by means of the cam slot and cam pin in response to pivotable movement of the knob.

Additional details of the present invention include means for connecting the telescopes for relative movement about a common axis to accommodate interpupillary spacing adjustment between the telescopes. The connecting means preferably includes a hinge pin defining the common axis for relative movement of the telescopes and further includes a bracket hinged to rotate about the hinge pin, and a hub is advantageously mounted for rotation about the hinge pin. With this arrangement, the knob is mounted on the hub for pivotable movement about an axis extending generally perpendicular to the common axis defined by the hinge pin.

Still additional details of the present invention include one end of the knob having a bore and counterbore. The bore is provided to receive the fastener in a fashion accommodating pivotable movement of the knob with the counterbore being provided to receive a head of the fastener which is advantageously a screw adapted to be threadably secured to the hub. In addition, the bore is dimensioned to receive a sleeve covering the threads between the hub and the head of the screw.

Furthermore, the binocular focusing mechanism includes means for maintaining the knob in a plane extending generally parallel to the plane defined by the telescopes. The plane maintaining means advantageously includes an arm joining the hub to the bracket such that the arm, which preferably includes a first portion joined to the hub and a second portion joined to the rotatably mounted portion of the bracket, causes the hub to rotate during relative movement of the telescopes. In other words, relative movement of the telescopes causes the hub to move with the rotatably mounted portion of the bracket.

Still other advantages and features of the present invention will become apparent from a consideration of the detailed description which follows when taken in conjunction with the accompanying drawings.

DETAILED DESCRIPTION OF THE PREFERRED EMBODIMENT

Figure 1:
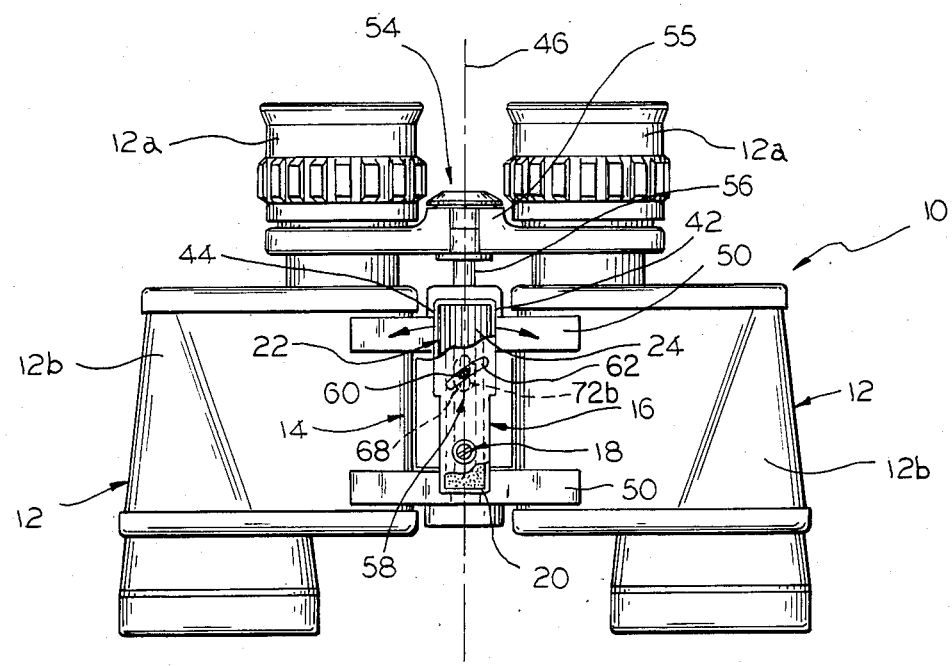
FIG. 1 is a plan view of a binocular utilizing the binocular focusing mechanism of the present invention.

Referring to the drawings, and first to FIG. 1, the reference numeral 10 designates generally a binocular in accordance with the present invention. The binocular 10 has a pair of telescopes 12 disposed in parallel relation and has conventional optical elements (not shown) in each of the telescopes 12 for magnifying an object image. In addition, the binocular 10 includes a binocular focusing mechanism 14 adapted to effect focus of the conventional optical elements by causing movement thereof.

Still referring to FIG. 1, the binocular focusing mechanism 14 includes a pivotable knob 16 operatively joined to the optical elements. The knob 16 is a generally elongated member normally extending generally parallel to the telescopes 12 and it is mounted between the telescopes 12 in a plane extending generally parallel to the plane defined by the telescopes 12 for pivotable movement about a pivot point 18 located generally at one end 20 thereof. In addition, the knob 16 also includes a finger contacting portion 22 located generally at the other end 24 of the elongated member.

Figures 2, 3:
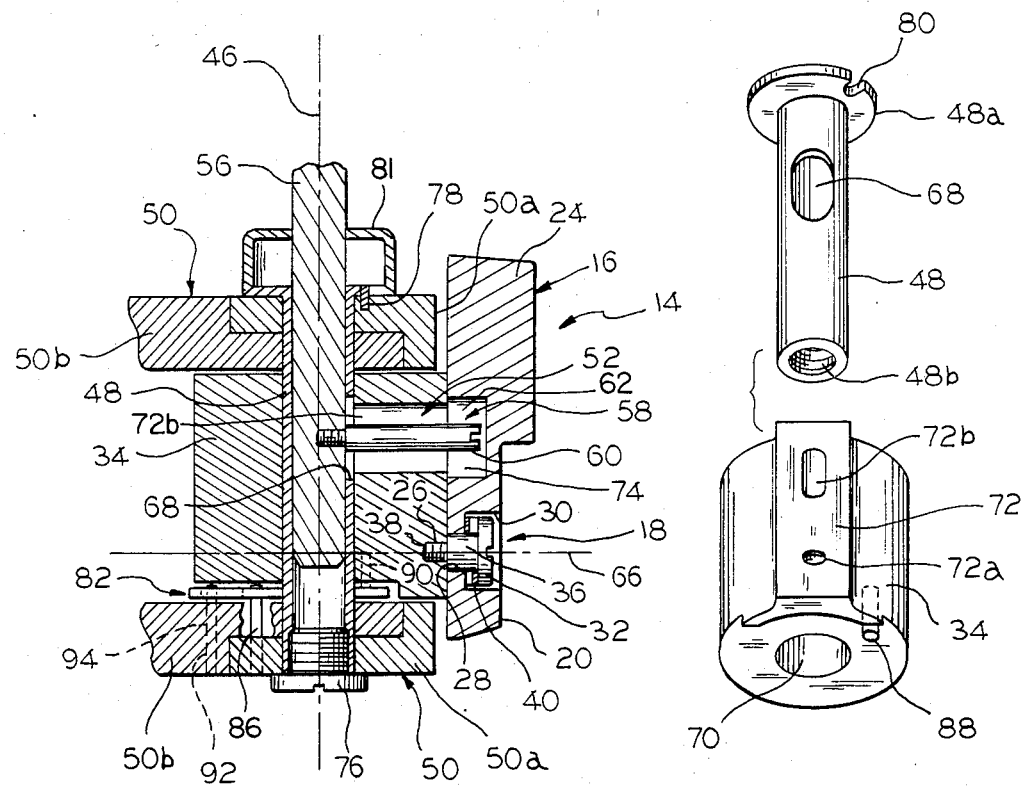
FIG. 2 is a cross-sectional view of the binocular focusing mechanism utilized in the binocular in FIG. 1.
FIG. 3 is an exploded perspective view of a portion of the binocular focusing mechanism utilized in the binocular in FIG. 1.

Referring to FIG. 2, the binocular focusing mechanism 14 includes a fastener 26 defining the pivot point 18 of the elongated member 16. The fastener 26, which accommodates pivotable movement of the knob 16, is disposed generally perpendicular to the plane defined by the telescopes 12. With this arrangement, pivotable movement of the elongated member 16 about the fastener 26 causes movement of the optical elements to effect focus.

Still referring to FIG. 2, the one end 20 of the pivotable knob 16 includes a bore 28 and a counterbore 30. The bore 28 is provided to receive the fastener 26 so as to accommodate pivotable movement of the knob 16 with the counterbore 30 being provided to receive the head 32 of the fastener 26. Still more particularly, the fastener 26 is preferably a screw adapted to be threadably secured to the hub 34 with the bore 28 being dimensioned to receive a sleeve 36 covering the threads 38 between the hub 34 and the head 32 on the shank of the screw 26. The counterbore 30 is adapted to accommodate a spring washer 40 under the head 32 of the screw 26 for biasing the knob 16 against the hub 34 to maintain the optical elements in a desired position. As will be appreciated, not only does the spring washer 40 maintain the optical elements in focus, but also the sleeve 36 is adapted to facilitate the movement of the knob 16 about the fastener 26 to effect focus.

Referring once again to FIG. 1, the finger contacting portion 22 includes a first finger engaging surface 42 facing one of the telescopes 12 and a second finger engaging surface 44 facing the other of the telescopes 12. The finger engaging surfaces 42 and 44 are disposed generally perpendicular to the plane defined by the telescopes 12 for engagement by at least one finger of each hand of a user, and they are spaced apart to lie in generally parallel planes and located to accommodate back and forth movement of the knob 16 with the user's hands in a naturally assumed gripping position on the binocular 10. With this arrangement, the movement of the knob 16 is effected by pressing on one finger engaging surface (such as 42) with at least one finger of one hand and pressing on the other finger engaging surface (such as 44) with at least one finger of the other hand.

More particularly, the forces are applied to the finger engaging surfaces 42 and 44 by pressing with the fingers such that the forces are generally colinear and oppositely directed (as suggested by the arrows in FIG. 1). This makes it possible to effect slight back and forth movement of the knob 16 for very accurate focusing. As will be appreciated, the force applied by pressing on one finger engaging surface (such as 42) with one finger of one hand is countered by force applied by pressing on the other finger engaging surface (such as 44) with one finger of the other hand.

As shown in FIG. 1, the binocular 10 includes means for connecting the telescopes 12 for relative movement about a common axis 46. This permits interpupillary spacing adjustment between the telescopes 12 and, in particular, the connecting means includes a hinge pin 48 defining the common axis 46 and accommodating relative movement of the telescopes 12. Moreover, the connecting means further includes a pair of arms or brackets 50, which rotate relative to the hinge pin 48, to join the telescopes 12 for relative movement about the common axis 46 (see, also, FIGS. 2, 4 and 5).

Referring to FIGS. 2 and 3, the knob 16 is operatively joined to the optical elements by coupling means 52 responsive to pivotable movement of the knob. The coupling means 52 includes a connecting member 54 joining the optical elements in the telescopes 12 and the connecting member 54 includes a bridge member 55 having a pin 56 extending therefrom and cam means 58 (see FIG. 1) operatively joining the connecting member pin 56 and the knob 16. The cam means 58 includes a cam pin 60 and a cam slot 62 with the cam pin 60 preferably being secured to and extending radially from the connecting member pin 56 (see FIG. 2) in engagement with the cam slot 62 in the knob 16. Moreover, the cam slot 62 is disposed intermediate the ends 20 and 24 of the knob 16 between the finger contacting portion 22 and the pivot point 18, and the knob 16 is adapted to drive the connecting member pin 56 by means of the cam slot 62 and cam pin 60 in response to pivotable movement of the knob 16.

Still referring to FIGS. 2 and 3, the hub 34 is mounted for rotation about the hinge pin 48 defining the common axis 46 for relative movement of the telescopes 12, and the knob 16 is mounted on the hub 34 for pivotable movement about an axis 66 extending generally perpendicular to the common axis 46 defined by the hinge pin 48. Moreover, the brackets 50 each include a first portion 50a fixed relative to the hinge pin 48 and a second portion 50b rotatably mounted relative to the hinge pin 48, and the hub 34 generally remains stationary relative to either the first or second portion of the brackets 50 during relative movement of the telescopes 12.

As will be appreciated, the hinge pin 48 is provided with an axially extending slot 68. The slot 68 (as shown in FIG. 2) is adapted to accommodate the cam pin 60 which is threaded into the connecting member pin 56 and extends through the slot 68 and the cam slot 62. With this arrangement, pivotable movement of the knob 14 causes the cam slot 62 to drive the cam pin 60 along the slot 68, and the cam pin 60 causes the connecting member pin 56 to move axially along the common axis 46. The connecting member pin 56 drives the bridge member 55 joining the optical elements in the telescopes 12 to effect focus in response to pivotable movement of the knob 16. As previously mentioned, the knob 16 is pivotably moved by generally colinear and oppositely directed forces applied by at least one finger of each hand on the finger engaging surface 42 and 44.

Referring to FIGS. 2 and 3, the hub 34 is provided with a central bore 70 adapted to receive the hinge pin 48. The hub 34 also includes a flat mounting surface 72 having a hole 72a near one end thereof to receive the screw 26, and it has a slot 72b near the other end thereof extending radially inwardly in communication with the central bore 70 to accommodate the cam pin 60. Also as shown, a recess 74 is provided in the underside of the knob 16 to accommodate the head of the cam pin 60.

As shown in FIGS. 2 and 3, the hinge pin 48 has a radially extending flange 48a at one end with internal threads 48b at the other end. The hinge pin 48 is adapted to extend through the brackets 50 and the hub 34 (as shown) and is secured in assembled relation by means of a screw 76 cooperating with the threads 48b and a pin 78 extending from the first portion 50a of one of the brackets 50 into a circumferential notch 81 in the radially extending flange 48a. Finally, a cap 80 is disposed about the connecting member pin 56 in cooperation with the radially extending flange 48a.

Referring to FIG. 1, the telescopes 12 each include a slidable ocular housing 12a mounted for movement into and out of the corresponding telescope body portion 12b. It will be appreciated that the bridge member 55 is secured to the slidable ocular housings 12a and, as a result, movement of the knob 16 is translated into movement of the housings 12a by means of the cam pin 60, cam slot 62, connecting member pin 56, and bridge member 55. In turn, since the optical elements are mounted conventionally in the slidable ocular housings 12a, movement of the housings effects focus of the binocular.

Figure 4:
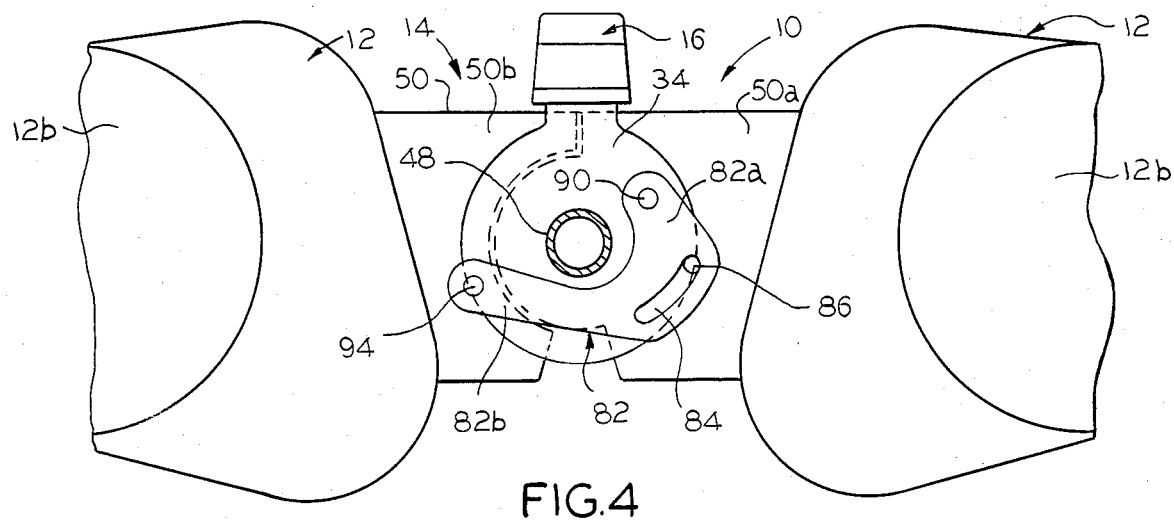
FIG. 4 is an end elevational view showing a position of maximum interpupillary spacing for the binocular in FIG. 1.
Figure 5:
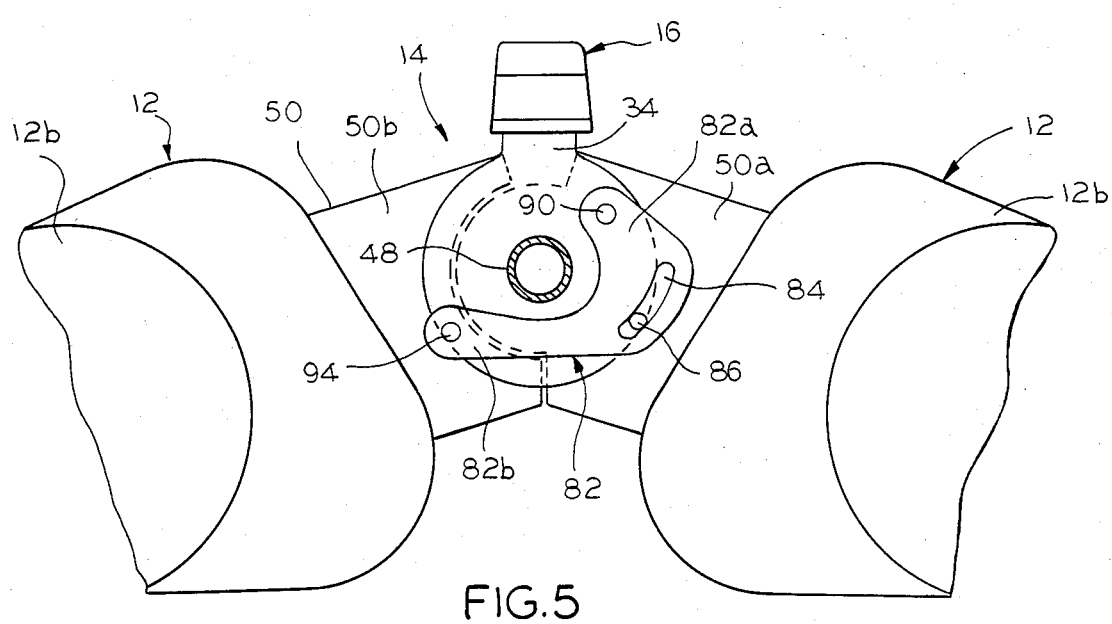
FIG. 5 is an end elevational view showing a position of minimum interpupillary spacing for the binocular in FIG. 1.

Referring to FIGS. 2, 4 and 5, the binocular 10 includes means for maintaining the elongated member 16 in a plane extending generally parallel to the plane defined by the telescopes 12. The plane maintaining means, which can best be understood by referring to FIGS. 4 and 5 where the outermost bracket 50 has been removed, includes an arm 82 joining the hub 34 to the corresponding bracket 50 (see FIG. 2) such that the arm 82 causes the hub 34 to rotate during relative movement of the telescopes 12 by reason of the fact that the arm 82 includes a first portion 82a joined to the hub 34 and a second portion 82b joined to the rotatably mounted portion 50b of the bracket 50. With this arrangement, relative movement of the telescopes 12 causes the hub 34 to move with the rotatably mounted portion 50b of the bracket.

Also as shown, the arm 82 includes an arcuate slot 84 having a pin 86 disposed in the slot 84 to determine the limits of relative movement of the telescopes 12. It will be appreciated that the pin 86 extends from the first portion 50a of the bracket 50 to cooperate in this fashion with the slot 84. As shown in the drawings, the arm 82 causes the elongated member 16 to be maintained in a plane extending generally parallel to the plane defined by the telescopes 12 from the minimum to maximum interpupillary spacing positions.

Referring to FIGS. 2 and 3, it will be appreciated that the hub 34 includes a small radially disposed hole 88 adapted to receive a pin 90 extending from the arm 82. The rotatably mounted portion 50b also includes a small hole 92 adapted to receive a pin 94 extending from the arm 82. Because of the fact that the arm 82 is disposed between the hub 34 and the bracket 50, the arm 82 stays in assembled relation with the pins 90 and 94 disposed in the small holes 88 and 92, respectively.

Figure 6:
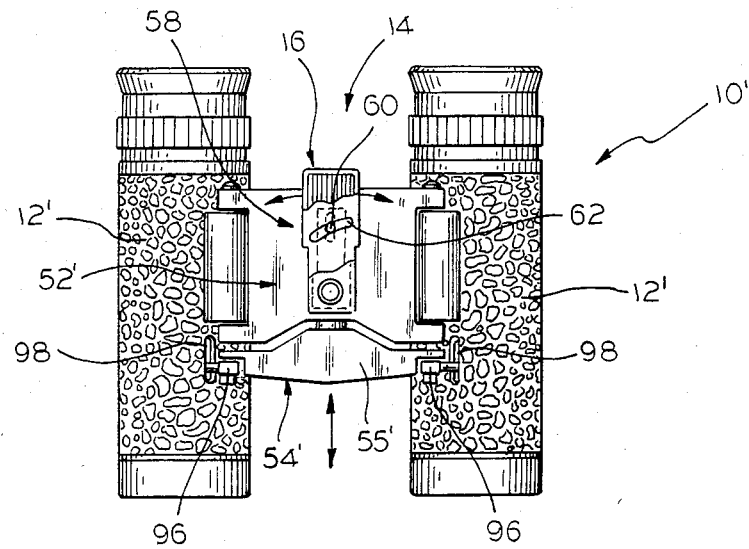
FIG. 6 is a plan view of another binocular utilizing the binocular focusing mechanism of the present invention.

Referring now to FIG. 6, another binocular 10' is illustrated utilizing the binocular focusing mechanism 14 of the present invention. It will be appreciated that a binocular 10', which is commonly known as a roof prism binocular, is comprised of a pair of telescopes 12' disposed in parallel relation and again has conventional optical elements (not shown) in each of the telescopes 12' for magnifying an object image. However, the binocular 10' does not include slidable ocular housings mounted for movement into and out of corresponding telescope body portions.

Instead, the knob 16 is operatively joined to the optical elements by coupling means 52' responsive to pivotable movement of the knob. As shown, the coupling means 52' includes a connecting member 54' joining the optical elements in the telescopes 12' and the connecting member 54' includes a bridge member 55' having a pin 56' extending therefrom and cam means 58 operatively joining the connecting member pin 56' and the knob 16. The cam means 58 in this embodiment again includes a cam pin 60 and a cam slot 62 with the cam pin 60 preferably being secured to and extending radially from the connecting member pin 56' in engagement with the cam slot 62 in the knob 16. Moreover, the bridge member 55' is connected to the optical elements by connecting links 96 joined to the bridge member 55' on opposite sides thereof and projecting into the interior of the telescopes 12' through axially extending slots 98. In all other respects, the binocular 10' utilizes the same binocular focusing mechanism 14 as the binocular 10.

With the present invention, a unique binocular focusing mechanism for a binocular having generally parallel telescopes with movable optical elements has been provided. It operates in a fast-focus fashion, is easy to use with the hands in a normal and naturally assumed position, and overcomes the problems inherent in most prior binocular focusing mechanisms. Moreover, the binocular focusing mechanism utilizes a relatively simple structure which is essentially maintenance free and inexpensive to manufacture in comparison with prior systems.

Variations of the details herein given may be made by those skilled in the art without departing from the spirit and scope of the present invention as defined by the appended claims.

I claim:

1. In a binocular having a pair of telescopes disposed in parallel relation and having optical means in each of the telescopes for magnifying an object image, the improvement comprising:
    means for effecting focus of the optical means by movement thereof, the focus means including a pivotable knob operatively joined to the optical means, the knob being a generally elongated member normally extending generally parallel to the telescopes, the elongated member being mounted between the telescopes in a plane extending generally parallel to the plane defined by the telescopes for pivotable movement about a pivot point located generally at one end thereof, the knob also including a finger contacting portion located generally at the other end of the elongated member, the focus means including a fastener defining the pivot point of the elongated member, the fastener being disposed generally perpendicular to the plane defined by the telescopes;
    means for accommodating interpupillary spacing adjustment between the telescopes; and
    means for maintaining the elongated member in a plane extending generally parallel to the plane defined by the telescopes independent of the spacing of the telescopes;
    whereby pivotable movement of the elongated member about the pivot point causes movement of the optical means to effect focus and the elongated member is maintained in a plane extending generally parallel to the plane defined by the telescopes to accommodate pivotable movement.

2. The binocular as defined by claim 1 wherein the finger contacting portion includes a first finger engaging surface facing one of the telescopes and a second finger engaging surface facing the other of the telescopes.

3. The binocular as defined by claim 2 wherein the finger engaging surfaces are disposed generally perpendicular to the plane defined by the telescopes for engagement by at least one finger of each hand of a user.

4. The binocular as defined by claim 3 wherein the finger engaging surfaces are spaced apart to lie in generally parallel planes, the finger engaging surfaces being located to accommodate back and forth movement of the knob.

5. The binocular as defined by claim 4 wherein the movement of the knob is effected by pressing on one finger engaging surface with at least one finger of one hand and pressing on the other finger engaging surface with at least one finger of the other hand.

6. The binocular as defined by claim 5 wherein forces are applied to the finger engaging surfaces by pressing with the fingers, the applied forces being generally colinear and oppositely directed to effect movement of the knob.

7. The binocular as defined by claim 6 wherein the force applied by pressing on one finger engaging surface with one finger of one hand may be countered by force applied by pressing on the other finger engaging surface with one finger of the other hand to effect focus of the optical means.

8. The binocular as defined in claim 1 including means for connecting the telescopes for relative movement about a common axis, the connecting means comprising the means for accommodating interpupillary spacing adjustment between the telescopes.

9. The binocular as defined by claim 8 wherein the connecting means includes a hinge pin defining the common axis for relative movement of the telescopes, the connecting means also including a bracket hinged to rotate about the hinge pin.

10. The binocular as defined by claim 9 including a hub mounted for rotation about the hinge pin defining the common axis for relative movement of the telescopes, the knob being mounted on the hub for pivotable movement about an axis extending generally perpendicular to the common axis defined by the hinge pin.

11. The binocular as defined by claim 10 wherein the bracket includes a first portion fixed relative to the hinge pin and a second portion rotatably mounted relative to the hinge pin, the hub generally remaining stationary relative to either the first or second portion of the bracket during relative movement of the telescopes.

12. The binocular as defined by claim 11 wherein the plane maintaining means includes an arm joining the hub to the bracket, the arm causing the hub to rotate during relative movement of the telescopes.

13. The binocular as defined by claim 12 wherein the arm includes a first portion joined to the hub and a second portion joined to the rotatably mounted portion of the bracket whereby relative movement of the telescopes causes the hub to move with the rotatably mounted portion of the bracket.

14. The binocular as defined by claim 10 wherein one end of the knob includes a bore and counterbore, the bore being provided to receive the fastener in a fashion accommodating pivotable movement of the knob, the counterbore being provided to receive a head of the fastener.

15. The binocular as defined by claim 14 wherein the fastener is a screw adapted to be threadably secured to the hub, the bore being dimensioned to receive a sleeve covering the threads between the hub and the head of the screw, the sleeve accommodating pivotable movement of the knob.

16. The binocular as defined by claim 15 including a spring washer disposed in the counterbore under the head of the screw, the spring washer biasing the knob against the hub to maintain the optical means in a desired position after effecting focus.

17. The binocular as defined in claim 1 wherein the pivotable knob is operatively joined to the optical means by coupling means, the coupling means being responsive to pivotable movement of the elongated member to move the optical means.

18. The binocular as defined by claim 17 wherein the coupling means includes a connecting member joining the optical means in the telescopes, the connecting member including a bridge member having a pin extending therefrom, and cam means operatively joining the connecting member and the knob.

19. The binocular as defined by claim 18 wherein the cam means includes a cam pin and a cam slot, the cam pin being supported on the connecting member pin, the cam slot being provided in the knob.

20. The binocular as defined by claim 19 wherein the cam slot is provided in the knob, the cam pin being secured to and extending radially from the connecting member pin, the cam pin being in engagement with the cam slot.

21. The binocular as defined by claim 20 wherein the cam slot is disposed intermediate the ends of the knob between the finger contacting portion and the pivot point thereof, the knob being adapted to drive the member pin through the cam slot and cam pin in response to pivotable movement of the knob.

* * * * *